US007962157B2

(12) United States Patent
Coffing

(10) Patent No.: US 7,962,157 B2
(45) Date of Patent: Jun. 14, 2011

(54) ELECTRONIC BUSINESS/PERSONAL CARD AND METHOD OF USE THEREOF

(76) Inventor: Dan Coffing, Fairfax, VA (US)

( * ) Notice: Subject to any disclaimer, the term of this patent is extended or adjusted under 35 U.S.C. 154(b) by 692 days.

(21) Appl. No.: 11/489,435

(22) Filed: Jul. 20, 2006

(65) Prior Publication Data

US 2008/0064374 A1    Mar. 13, 2008

(51) Int. Cl.
*H04W 24/00*    (2009.01)
(52) U.S. Cl. .................. 455/456.3; 455/151.2; 455/41.2
(58) Field of Classification Search .................. 455/418; 370/328
See application file for complete search history.

(56) References Cited

U.S. PATENT DOCUMENTS

| 5,086,394 | A | 2/1992 | Shapira et al. |
| 6,408,351 | B1 | 6/2002 | Hamdi et al. |
| 7,420,472 | B2 * | 9/2008 | Tran .......................... 340/573.1 |
| 7,592,910 | B2 * | 9/2009 | Tuck et al. ............... 340/539.13 |
| 2002/0161844 | A1 * | 10/2002 | Overtoom ..................... 709/208 |
| 2004/0120298 | A1 | 6/2004 | Evans et al. |
| 2004/0248569 | A1 * | 12/2004 | Kondou et al. ............. 455/426.1 |
| 2005/0170699 | A1 * | 8/2005 | Overtoom ..................... 439/639 |
| 2005/0174975 | A1 | 8/2005 | Mgrdechian et al. |
| 2005/0239450 | A1 * | 10/2005 | Wesby .......................... 455/418 |
| 2006/0035621 | A1 | 2/2006 | Ghercioiu |
| 2006/0109811 | A1 * | 5/2006 | Schotten et al. ............... 370/328 |
| 2006/0138225 | A1 | 6/2006 | Richley et al. |
| 2007/0016443 | A1 * | 1/2007 | Wachman et al. ................ 705/2 |
| 2007/0197261 | A1 * | 8/2007 | Humbel ........................ 455/558 |
| 2007/0260822 | A1 * | 11/2007 | Adams .......................... 711/147 |

OTHER PUBLICATIONS

PCT Notification of Transmittal of the International Search Report and the Written Opinion of the International Searching Authority, or the Declaration, dated Jan. 7, 2008.

* cited by examiner

*Primary Examiner* — Nick Corsaro
*Assistant Examiner* — Isaak R Jama
(74) *Attorney, Agent, or Firm* — Stites & Harbison, PLLC; Juan Carlos A. Marquez, Esq

(57) ABSTRACT

The present invention includes a wireless communication method and device comprising a one-to-one exchange of wireless electronic device identifications or unique profile IDs between a sending and a receiving party who are both registered users of the electronic business/personal card service and further comprising upload of the wireless electronic identifications to a data server computer system wherein said system matches said identifications with those of registered users and said computer system displays information about the user associated with each identification.

33 Claims, 3 Drawing Sheets

ELECTRONIC BUSINESS/PERSONAL CARD AND METHOD OF USE THEREOF

FIELD OF THE INVENTION

The present invention relates to directionally targeted narrow-beam wireless communication devices, and in particular, to systems and methods of using such devices to provide an exchange of information between wireless devices held by persons in the ordinary course of social or business engagement.

BACKGROUND OF THE INVENTION

The traditional way of exchanging information between parties who are in the same physical location is by the physical exchange of business or contact cards. An individual who is actively engaged in any sort of social or business networking will end up being encumbered by numerous business cards carrying no more than names, addresses and phone numbers and no other way of actively assessing the business or social compatibility of the card provider and there is no active tie to the party's online profile.

Where parties are not in the same physical location, on-line dating and social networking constitute internet-facilitated modalities for meeting persons particularly in social engagements.

In on-line dating, members complete anonymous user profiles that are kept in a central database. Users can then search the central database to further their social interests. Upon identifying compatible social interests, messages are exchanged via the intermediation of the service provider.

In social-networking services, users fill out profile information that is stored in a central database. Those profiles are associated with other users in an internodal network arrangement where each user is linked to one or more third-parties through another user with which they have a pre-existing personal or business relationship. Users employ various search criteria to identify a subset of other users whom they may be interested in meeting and are generally allowed to contact or view the profiles of only those users with whom they are connected to through this internodal networking environment.

The key limitation of both on-line dating and social networking services is that both are online dominated and do not tie in to a user's day to day interaction with the offline universe. In other words, cyber world contact precedes real world contact and there is always the danger that the cyber profile is overly embellished and at marked variance with the real world profile.

US Published Application 2005/0174975 deals with a wireless communication methodology wherein real world contact coincides with cyber world contact whereby a user could access information about a specific unknown person in their general location in order to decide whether potential compatibilities (either business or personal) may exist between them. In US 2005/0174975, a methodology is described whereby a user broadcasts a search for compatible social or business interests in their general physical vicinity, receives and electronically reviews information about a potential contact within his/her vicinity and initiates contact by sending the user's profile back to the potential contact, whereupon it is hoped that real world contact will then ensue. The drawback to this system is that the user spends their time broadcasting and sifting through a myriad of online social protocols, using intelligent devices having image and data display capabilities rather than spending valuable time making the far more profitable flesh to flesh contact.

There is therefore a need for a wireless internet-facilitated networking device and methods of use thereof wherein the real world contact precedes cyber world contact in both social and business intercourse. For socially or professionally active individuals who meet other social or business interests all the time, exchange of cards is often the most convenient way to perpetuate that contact. Even then, business cards as it were, carry very little information, often have no pictures, and remain bland and faceless long after the contact has faded from memory. In social situations in particular, cards are not often available resulting in the inconvenience of locating pen and paper or such. Further, there is often the need to revisit and reassess the social or business compatibility of a contact in a more dynamical setting.

SUMMARY OF THE INVENTION

Embodiments of the present invention include a directionally targeted narrow-beam, portable, wireless communication device and methods for its use to facilitate the recordation and recollection of business or social contacts. In one embodiment, the present invention includes a wireless face-to-face communication method comprising a one-to-one exchange of wireless electronic device identifications or unique profile IDs between a sending and a receiving party who are both registered users of the electronic business/personal card service. As used herein, device refers to the wireless electronic business/personal card of the present invention.

Once the device has received one or more profile IDs, typically at the end of the networking event, the user uploads these IDs to a data server computer system using any suitable means of data communication such as cradles or Bluetooth. In a preferred embodiment, uploading is done via a USB interface on the wireless device to an Internet-connected computer. In another embodiment, uploading may be done via a wireless communication to the internet.

In one embodiment, the unique ID stored in a receiver's wireless electronic card may be uploaded to a central service which may include a website, a database and one or many servers. The system will then match the IDs with those of registered users and display information, including images of the users associated with the IDs. The displayed information may also be available for download.

In another embodiment, the user who has uploaded the received IDs to the data server logs into a world wide web-interface that allows them to classify their received IDs according to type, group, interest or some other classification. Since the received ID belongs to another registered user of the system, a picture and other general information will be available to refresh the user's memory of the networking encounter and to determine what the levels of interaction should be. In one embodiment, both users will have ability to determine the level of their information that will be seen by the other, and to set the available channels for future communication, e.g. IM, email, phone, etc or none at all.

Alternate embodiments include the cases where: 1) user's device communicates with the server via a cable, cradle or other physical connection to a PC or other electronic apparatus which can relay ID or other information to the server; or 2) through any form of wireless connection such as Bluetooth Wi-Fi or 802.11 which could relay the ID or other information either directly or through some intermediary (such as a cellular network or PC) to the server.

It is also an object of the invention to allow users in a business networking contact to select the relationship type such that other service-subscriber contacts can electronically access their business contact information, and at the option of the subscriber, detailed business resume and pictures.

In one embodiment of the invention, an events organizer can use a stationary version of this device to gather and store profile IDs of attendees of the event, upload the profile IDs and have a list of prospects to communicate relevant news and offerings or other information relevant to the event. In a social networking embodiment, a list of locations frequented could be dynamically visible to one's trusted circle of online friends. Related online profile information may be such things as name, age, phone numbers, email address, zip codes of residence, activity, interests, blogs, photo's etc, depending on the nature and the type of the online connection site being utilized.

In another embodiment, the sender and receiver's wireless devices exchange ID's using a first local wireless protocol, and the uploading wireless device and a remote web-connected computer are coupled together over a second wireless network.

In yet another embodiment, the present invention includes a computer system coupled to a network, the computer system including software for performing a method comprising storing a plurality of wireless device identifications, storing information for a plurality of users, associating the wireless device identifications with the information, receiving wireless device identification from a wireless device via a computer interface and accessing the information associated with the one or more wireless device identifications. In one embodiment, the wireless device identifications and information are stored in a database accessible over the Internet.

In another embodiment, accessing the information comprises generating a query to a database using the wireless device identification and retrieving information associated with the wireless device identification in response to the query.

In yet another embodiment, the present invention includes a wireless electronic card device comprising an external case housing a power supply, a USB interface, a targetable, narrow-beam send/receive hardware component, a transmit button, confirmation LED(s), processor, memory, USB transaction software, selector switch, and internal clock/calendar. In other embodiments, the device is embedded in a watch, a broach, a pendant, a necklace, a ring, an earring, an article of clothing, a clothing label, a wallet or a key-chain. In other embodiments, the device is integrated into a credit-card form-factor.

The wireless electronic business/personal card devices of the present invention can be of multiple forms including ones with only the discrete functionality of the present invention, or integrated into or with other devices such as cell-phones, PDA's or music players either through embedded hardware or as a software application. In addition, the devices can have the capability to act as both Sender and Recipient (for users interested in sending and receiving profile IDs), to act only as a Sender (for users not interested in receiving profile IDs) or to act only as a Recipient (for users who are interested in receiving profile IDs). Additionally, particularly in the case of a Recipient-only device, one embodiment of the present invention provides that the form-factor can be such that the device appears as a piece of jewelry such as a broach, pendant, ring, earring, or as a clothing label, a key-chain, integrated into a credit-card form-factor, integrated into clothing itself or as some other fashion statement which can be both aesthetically pleasing and alert others that a person is a user of the system.

Additional embodiments of the present invention also include medical applications where a user's online profile may contain medical or other information that may be accessed by a doctor, pharmacist, emergency services technician or other health care provider. Yet another embodiment of the present invention includes software, which can be downloaded into an existing platform to enable it to practice the present invention and perform in the techniques described herein.

Embodiments of the present invention also include any and all business methods for generating revenue and income through the sales of hardware, software and services that include one or more embodiments of the invention described herein. These include (a) selling software for use on an existing hardware platform to enable the invention, (b) the sale of hardware (including jewelry or other form factors) to enable the invention, and (c) charging users on an annual, monthly or per-message basis for use of the service/invention. These business methods also include the ability to charge users for the exchange of messages or information processed through one or many central servers based on IDs exchanged earlier between mobile devices as described above. Users of the device and service (i.e. senders or recipients, or both), may include individuals, businesses, not-for-profit organizations, advertisers, political action groups, or any other organization.

The preferred embodiment of the present invention would also include (e.g., as part of the server) a web-based user interface for registration and profile management. Information provided by users through this interface would include, but not be limited to the unique ID of their mobile device, their name, address, billing information (if applicable), username, profile information, photo, preferences and names of friends. The user interface could also function as a messaging center in which the user can keep track of messages sent or received as well as the profiles that they have viewed. Embodiments of the present invention include hardware or software allowing a mobile device, such as a cell phone, to incorporate some or all of this functionality.

Additional embodiments will be evident from the following detailed description and accompanying drawings, which provide a better understanding of the nature and advantages of the present invention.

DETAILED DESCRIPTION OF PREFERRED EMBODIMENTS

In the following description, for purposes of explanation, specific details are set forth in order to provide a thorough understanding of different aspects of the present invention. It will be evident, however, to one skilled in the art that the present invention as defined by the claims may include some or all of the features or embodiments herein described and may further include obvious modifications and equivalents of the features and concepts described herein.

Embodiments of the present invention use wireless protocols and networks for implementing novel methods and algorithms that obviate the need for non-electronic business and contact cards. Wireless signaling protocols may be used to exchange unique electronic profile IDs between user-subscribers who wish to perpetuate the contact. As used in this specification, profile IDs refer to unique electronic identifications associated with a given user and a given device.

The present invention provides users with the ability to first interact in the real world and follow up, if desired, by further interaction in the cyber world, thus obviating the need to browse through boring, contrived or misleading classified advertisements or on-line profiles.

Figure 1:
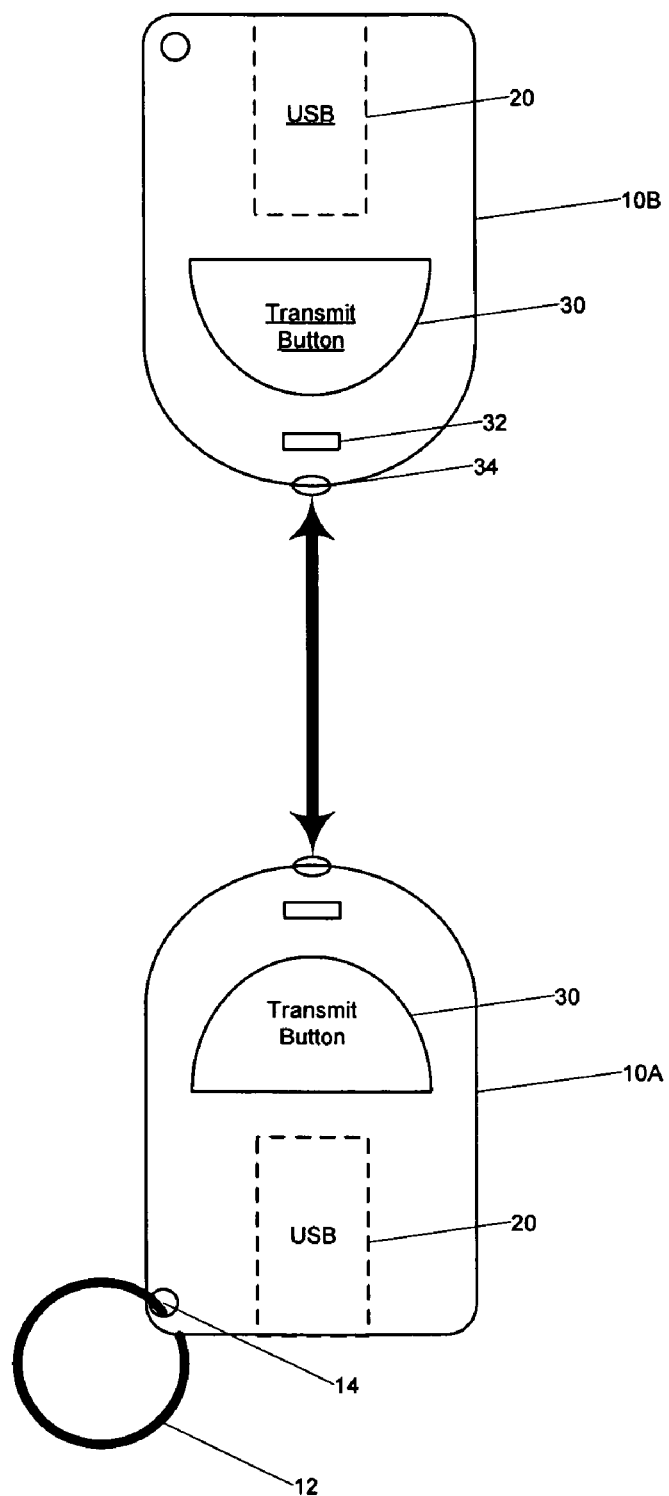
FIG. 1 illustrates a contact event between two devices according to one embodiment of the present invention.
Figure 2:
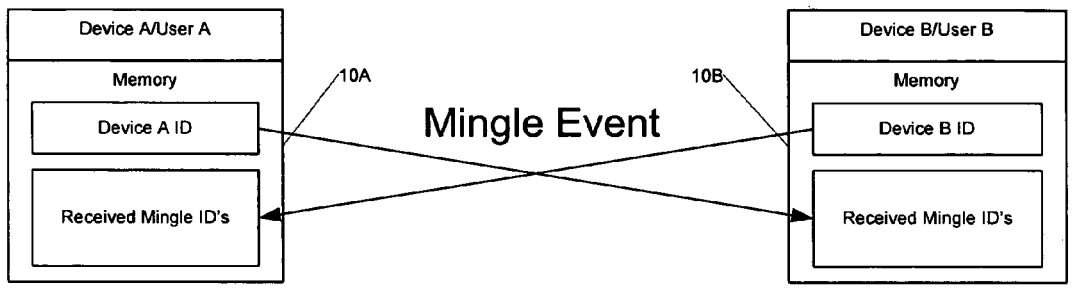
FIG. 2 is another illustration of a contact event according to another embodiment of the present invention.

FIG. 1 illustrates a contact event according to one embodiment of the invention. Wireless devices 10A and 10B each comprise a power supply, a USB 20, a single transmit button 30 for transmitting profile IDs, a LED 32, and an Infra red transmitter/receiver. FIG. 1 illustrates a directional mode of data exchange between devices 10A and 10B which are preferably less than five feet apart and pointed at each other. In another embodiment, the uni-direction transmission range is extended to 30-40 ft such that a passive device could receive IDs from interested parties within sight, but not within conversational distance.

The preferred mode of communication between the devices is a directionally targeted narrow electromagnetic beam or ultrasonic beam sent between one sending and one receiving device. Since the intent is to support one to one personal contact, the design is such as to prevent the exchange of ID's other than to/from the intended physically proximate party. The same or different wireless technology may be used for a reply made by the receiving device to the sending device. However, embodiments of the presented invention are not limited to any specific currently existing or future wireless technologies.

Figure 3:
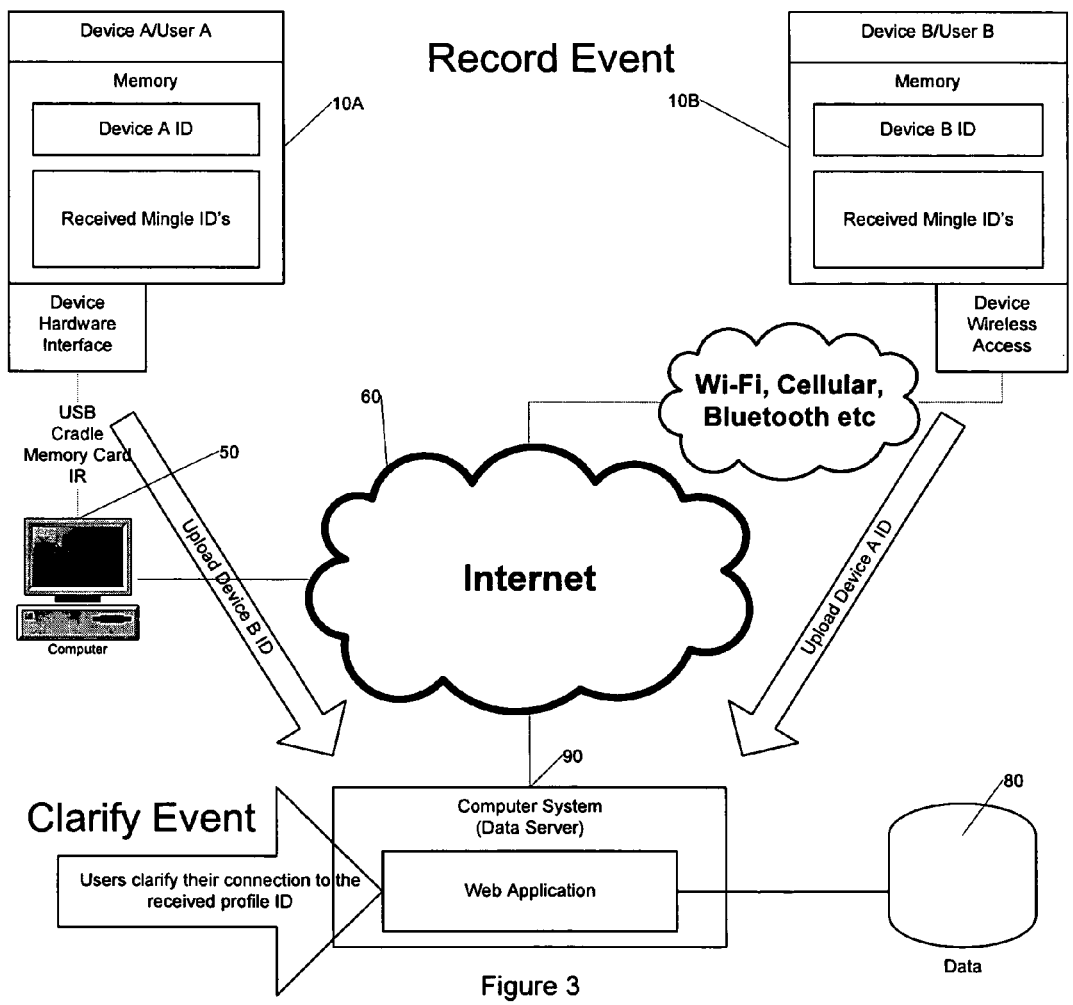
FIG. 3 is an example of a system according to another embodiment of the present invention.

As illustrated in FIG. 3, the receiving device 10A and 10B, having no display capability, may upload the received device IDs to a computer system 50 connected to the Internet 60. Computer system 50 may be an Internet server computer and may include multiple computers coupled to the Internet for processing information as described herein, for example, and may further include a web application 70 having a user interface that allows users to update their profile, store, classify, and organize their portfolio of profiles. Computer system 50 may provide access to further information about the user of the sending device or other users associated with the device IDs received from the sending device. Furthermore, computer system 50 may act as a central storage location for all user information as well as a clearinghouse and delivery system for messages sent between users.

For example, the device IDs may be uploaded to a computer system 50 and used by a web application 70 and a database 80 to access information associated with each device ID. In one embodiment, when computer system 50 receives a device ID, web application 70 may generate a database query using the device IDs received from wireless device 10. Database 80 retrieves information associated with each device ID in the query, and then formats the information to display to the user-subscriber. In one embodiment, device IDs may be included as fields (e.g., indexes) in database tables that are associated with other information in the database, for example. The association may be implemented using a variety of techniques such as associated fields in a relational database or as links or references between objects, for example. The information in database 80 may have been set up previously by a user accessing a web address for computer system 50 (e.g., using the web application 70) or a related website or using a related web application such as an Internet browser. Database 80 may be a single database, distributed database or other data storage systems that can use device IDs to access information associated with device IDs. The associated information may be updated automatically or manually by a user who accesses the information through computer system 50 (e.g., over the Internet or wirelessly). After the associated information has been retrieved, computer system 50 displays the information for the user-subscriber via a service provider interface.

Profile information may include a variety of information about a user's likes and dislikes, background, education, friends and other information such as text, audio, video, images (i.e., electronic pictures of the user), Blogs, links to favorite websites or items or services for sale. In one embodiment, users may specify a list of friends. Profile information for one or more parties met in the offline world may be stored internally on a user-subscriber computer system 50 or selectively deleted. Some or all of the profile information may be saved (e.g., as a complete profile or as a summary profile). Such profile information may be useful if the user desires to further pursue a mutual interest at a later time.

An additional embodiment of the present invention includes the use of the service and/or hardware for the electronic commerce applications including micropayments. Micropayments are prepaid accounts that may be used for low dollar amount purchases. Additional embodiments of the present invention also include medical applications where a user profile may contain medical or other information that may be accessed by a doctor, pharmacist, emergency services technician or other health provider. Yet another embodiment of the present invention includes software, which can be downloaded into an existing platform to enable it to practice the present invention and perform in the techniques described herein.

Embodiments of the present invention may also include business methods for generating revenue and income through the sales of hardware, software and services using the techniques described herein. These include (a) selling software for use on existing hardware platforms to enable the invention, (b) the sale of hardware (including jewelry or other form factors described below) to enable the invention, and (c) charging users on an annual, monthly or per-message basis for use of the services described herein. These business methods also include the ability to charge users for the exchange of messages or information processed through one or many central servers based on IDs exchanged between mobile devices and then uploaded as described above. It is to be understood that a variety of users (i.e. senders or recipients, or both) may benefit from various applications of the present invention. Users of the devices and services may include individuals, businesses, not-for-profit organizations, advertisers, political action groups, or any other organization.

Figure 4:
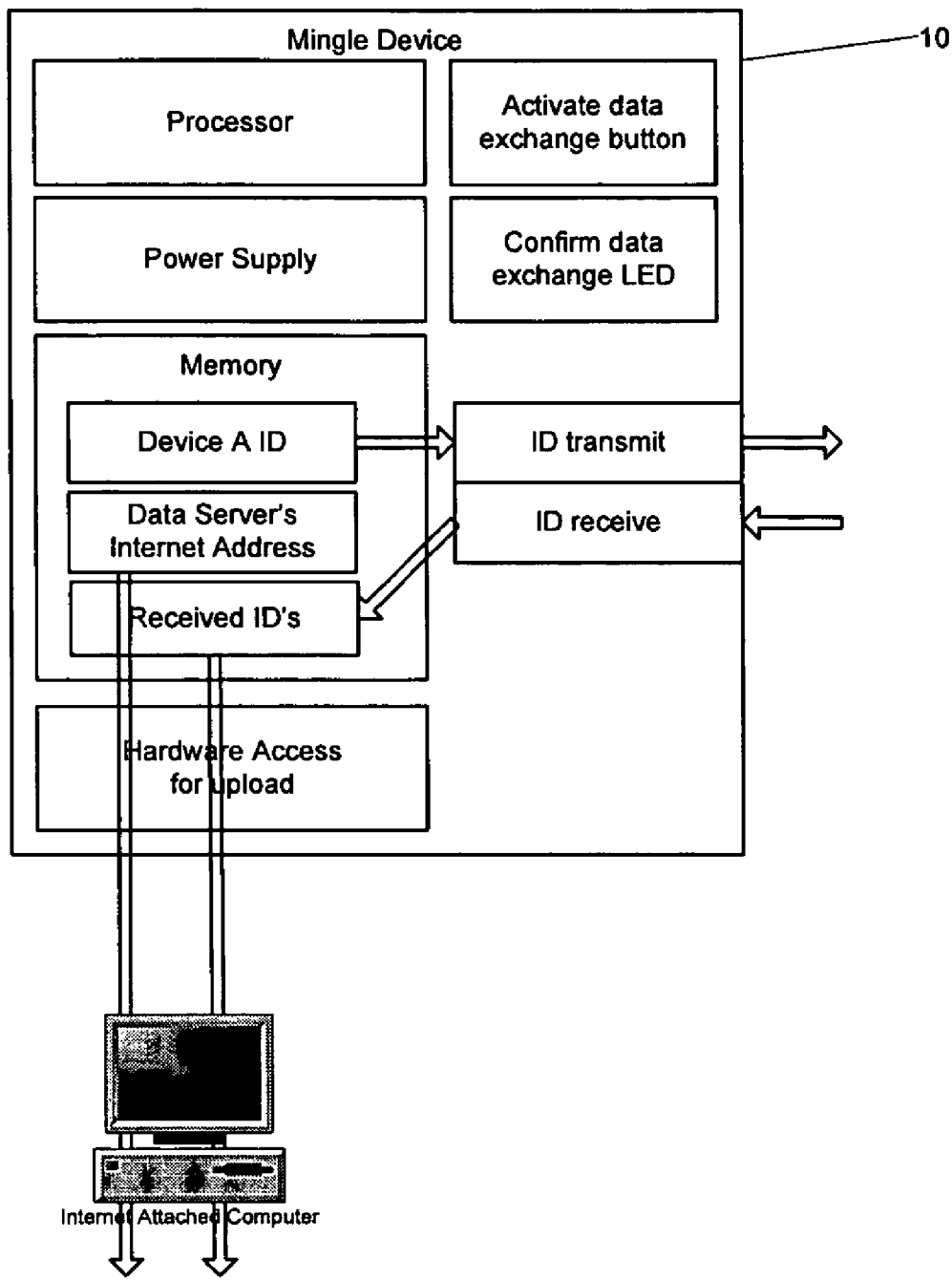
FIG. 4 is a functional schematic of a device according to another embodiment of the present invention.

FIG. 4 is an example of a wireless device according to an embodiment of the present invention. Wireless device 10 may act as both a sending and a receiving device. As the device is composed of components that are readily available, specification shall be by function, rather than address the technical particulars. In one embodiment, the device is a stand alone device having an external case. In the primary embodiment, the device shall be small, and in the form factor akin to the familiar wireless key ring devices used for remotely locking automobiles. Any plastic that is durable enough to handle frequent jostling will suffice. In other embodiments the electronic parts might be mounted in a 'dongle', a piece of jewelry, article of clothing or such. The key requirement is that it be portable and readily accessible in most social environments. In a preferred embodiment, the device weighs one ounce or less. In the stationary models for premise registrations, no restriction on form factor is required. Devices may be designed as suits the mounting structure, the scheme for accessing the Internet, as well as other aesthetics or functions may dictate.

In a preferred embodiment, the device is ruggedized by any means known in the art so that it can withstand the jostle and tumble of everyday life.

In another embodiment, the device shall have a retractable, foldable, or otherwise physically protected male USB interface such that the device can quickly interface to a computer. The USB interface shall be discrete and protected when not in use. Also, in one embodiment, the device shall have an infrared emitter for sending and receiving short bursts of data to/from a sister device. In a preferred embodiment, the transmitter will use data-transmission protocols suitable for successful delivery of 256 bits of data. The device shall have a single button to activate the IR send/receive function and the exchange of wireless identifications shall be accomplished by single button exchanges so that the flavor of the moment is not diluted by multiple clicks and button exchanges. When pressed, the emitter shall transmit the user's device ID until released, up to 15 seconds. If the button is held down longer than 15 seconds it will need to be released and re-pressed for the device to begin the cycle again. It is to be understood that longer or shorter transmission times are part of the invention. In the stationary embodiment, the device shall be set to always receive via an on/off switch.

While the device is transmitting data using the IR interface the LED(s) shall use a signal pattern (e.g. blinking) to indicate to the user the device's activity. When the IR receiver successfully receives data from another device the LED shall show an alternate signal pattern (e.g. solid for 2 seconds) to indicate the reception. Also, devices shall have an internal processor to control the interaction of the various electronic components. Including: the inter-device signaling protocol (IR or otherwise); error checking to prevent multiple copies of the same data being written successively; the LED signal pattern; the USB upload protocol; the initial process of the device to the data server and assigning it it's unique ID; the initiation process of the device to upload the particular users profile to the data server.

The read many-write once memory of the device shall contain the unique device ID and the Internet address of the data server. The read-write memory of the device shall receive the device ID's from the IR receive component and shall make them accessible via the USB interface.

Upon insertion into the USB of an Internet enabled computer, the device shall autorun a command that uploads the received ID's to the data server along with device ID so that the data can be associated with the correct online profile. The user is then taken to the login screen for the interface to the data server so that they're able to classify the recent uploaded contacts. If the automatic upload should fail, the user will also have the ability to query the device from the web interface so that the information can be retrieved.

In one embodiment, the device may be equipped with a manual switch with several settings such that the received ID's are pre-tagged with a certain group, social type or interest so as to shorten the processing during classification. Also, the devices may have an internal clock to date-time stamp the actual contact or mingling events The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Additionally, embodiments of the present invention may cover the operation of a wireless device, including software algorithms performed on a wireless device, or the operation of a computer system, including software algorithms performed on a server, database or other computer network configuration for implementing backend processing. Based on the above disclosure and the following claims, other arrangements, embodiments, implementations and equivalents will be evident to those skilled in the art.

What is claimed is:

1. A wireless one-to-one communication method between two users of a service comprising the steps of:
   a sending party and a receiving party mutually selecting each other, the sending party having a sending device and the receiving party having a receiving device;
   between the sending party and the receiving party, mutually designating each other so as to allow one-to-one communication between only the sending device and the receiving device, said step of designating between the sending party and the receiving party including the sending party and the receiving party mutually targeting the sending and receiving devices by at least one of the parties performing at least one of the following steps: moving into proximity with the other party, aiming at least one of the sending and receiving devices relative to each other, mutually timing activation of the sending and receiving devices, and motioning at least one of the sending and receiving devices relative to each other;
   sending at least one unique electronic identification wirelessly between only the sending device and the receiving device in response to said mutually designating between the sending party and the receiving party;
   downloading the at least one identification locally to the receiving device; and
   using said at least one identification downloaded to the receiving device to access information from one or more databases.

2. The wireless one-to-one communication method of claim 1, further comprising:
   uploading at least one wireless electronic identification from the receiving device to a data server computer system,
   said system associating said identification with an identification of a user; and
   said computer system providing information about the user associated with the identification, said computer system being configured to limit access by a third party to the information.

3. The method of claim 1, wherein the information includes profile, text, audio, video, images, Blogs, website links or items or services for sale.

4. The method of claim 1, wherein the sending and receiving devices are each formed to be transmitters and receivers of an electronic identification.

5. The method of claim 1, wherein said step of accessing information about at least one of the parties includes the step of at least a party configuring a respective database to limit accessing by third parties of information associated with the party therein.

6. The method of claim 1, wherein said step of accessing information about at least one of the parties includes selectively controlling access by third parties of information by limiting levels of information accessible in the respective database.

7. The wireless one-to-one communication method of claim 1, wherein the at least one electronic identification downloaded locally to the receiving device is only associated with the information within one or more databases after the downloading thereof.

8. The wireless one-to-one communication method according to claim 1, wherein the at least one electronic identification downloaded locally to the receiving device is only associated with the information within one or more databases after the downloading thereof and after at least one of the sending party and receiving party configures the information in the one or more databases to allow access thereto.

9. A computer system coupled to a computer network, the computer system including software for performing a method that comprises the steps of:
storing a plurality of unique wireless device identifications;
storing information for a plurality of users;
associating the wireless device identifications with respective accounts for the plurality of users;
a sending user and a receiving user mutually selecting each other, the sending party having a first wireless device and the receiving party having a second wireless device;
between the sending user and the receiving user having a second wireless device, mutually designating each other so as to allow one-to-one communication between only the first and second wireless devices, said step of designating between the sending user and the receiving user including the sending user and the receiving user mutually targeting the first and second wireless devices by at least one of the users performing at least one of the following steps: moving into proximity with the other user, aiming at least one of the sending and receiving devices relative to each other, mutually timing activation of the sending and receiving devices, and motioning at least one of the sending and receiving devices relative to each other;
sending at least one unique electronic identification wirelessly between only the first and second wireless devices in response to said mutually designating between the sending user and the receiving user;
downloading the at least one unique electronic identification locally to the second wireless device; and
using said at least one unique electronic identification downloaded to the second wireless device to access the information associated with a respective account and a respective user from the computer network.

10. The computer system of claim 9, wherein the wireless device identification and the information are stored in one or more databases accessible over an Internet.

11. The computer system of claim 9, wherein using said at least one unique electronic identification downloaded to the second wireless device to access the information associated with the respective account and the respective user from the computer network comprises generating a query to a database using said at least one unique electronic identification and retrieving the information associated with the respective account and the respective user in response to the query.

12. The method of claim 9, further comprising:
uploading at least one electronic identification from the second wireless device to a data server computer system, said system matching said electronic identification with an identification of a user; and
said computer system providing information about the user associated with the identification of the user, said computer system being configured to limit access by third parties to the information.

13. The method of claim 9, further comprising:
said system matching said electronic identification with an identification of a user; and
said computer system providing information about the user associated with the identification of the user, said computer system being configured to limit access to the information.

14. The method of claim 12, wherein said limiting access to the information includes selectively controlling access by third parties of information by a user limiting levels of information accessible in the respective database.

15. The method of claim 13, wherein said limiting access to the information includes selectively controlling access by third parties of information by a user limiting levels of information accessible in the respective database.

16. The computer system of claim 9, further comprising the steps of:
accessing controls for the account associated with the electronic identification, wherein the controls are configured to limit access to the account and the information associated therewith; and
providing access to at least one of the account and the information associated therewith in response to the controls associated with the electronic identification.

17. The method of claim 9, wherein the first and second wireless devices are each formed to be transmitters and receivers of an electronic identification.

18. The method of claim 9, wherein said step of accessing the account and respective information about at least one of the users includes the step of at least a user configuring a respective database to limit accessing by third parties of information associated with the user therein.

19. The method of claim 9, wherein said step of accessing the account and respective information about at least one of the users includes selectively controlling access by third parties of information by limiting levels of information accessible in the respective database.

20. A wireless device for exchanging unique device identifications comprising:
an external case housing a power supply;
a data transfer interface;
a targetable send/receive hardware component;
an activation mechanism;
a processor; and
a memory,
wherein the wireless device is configured such that between a sending party having a first wireless device and a receiving party having a second wireless device, the sending party and the receiving party mutually select each other and mutually target the first and second wireless devices relative to each other, the sending party and the receiving party mutually designating each other so as to allow one-to-one communication between the first wireless device and the second wireless device,
wherein the first and second wireless devices are configured such that the one-to-one communication therebetween is initiated by the mutually targeting occurring by at least one of the parties performing at least one of the following steps: moving into proximity with the other party, aiming at least one of the first and second wireless devices relative to each other, mutually timing activation of the first and second wireless devices, and motioning at least one of the first and second wireless devices relative to each other, wherein at least one unique electronic identification is wirelessly sent between only the sending party and the receiving party in response to said mutually designating between the sending party and the receiving party, and wherein the at least one identification is downloaded locally to the memory in the second wireless device, and said at least one identification downloaded to the memory is used to access information from one or more databases.

21. The wireless device of claim 20, wherein the wireless device is a stand alone device having no display capabilities.

22. The wireless device of claim 20, wherein the wireless device is embedded in a watch, a cell-phone, a broach, a pendant, a necklace, a ring, an earring, an article of clothing, a clothing label, a wallet or a key-chain.

23. The wireless device of claim 20, wherein the wireless device is integrated into a credit-card form-factor.

24. A wireless device according to claim 20, wherein the data transfer interface includes a USB connector.

25. A wireless device according to claim 20, wherein the activation mechanism includes at least one of a button and a switch.

26. A wireless device according to claim 20, further comprising: one or more confirmation LEDs.

27. A wireless device according to claim 20, wherein the targetable send/receive hardware component includes a narrow beam emitter configured to emit a narrow beam of one of electromagnetic, infrared, ultrasonic and RF energy.

28. A wireless device according to claim 27, wherein the targetable send/receive hardware component further includes a narrow beam detector configured to detect and receive the narrow beam of one of electromagnetic, infrared, ultrasonic and RF energy, respectively.

29. A wireless device according to claim 20, wherein the mutually targeting occurs via the activation mechanism that is formed to activate by at least one of the parties performing at least one of the following steps: moving into proximity with the other party, aiming at least one of the first and second wireless devices relative to each other, mutually timing activation of the first and second wireless devices, and motioning at least one of the first and second wireless devices relative to each other.

30. A method for wireless one-to-one communication between two users of a service provider via software implemented in a server of the service provider and in each of a plurality of wireless sending and receiving devices, comprising:

(a) providing via the service provider a unique electronic identification associated with a corresponding one of a plurality of wireless sending and receiving devices;

(b) storing via the service provider data on at least one of a plurality of users, each user being associated with the electronic wireless identification of the corresponding wireless sending and receiving device assigned thereto;

(c) wirelessly exchanging between said plurality of users said unique electronic identifications by a sending user and a receiving user mutually designating each other so as to allow one-to-one communication between a respective sending device and a respective receiving device, wherein said step of mutually designating between the sending and the receiving user includes the sending user and the receiving user mutually selecting each other and mutually targeting the sending and receiving devices at each other by at least one of the sending and receiving users performing at least one of the following steps: moving into proximity with the other user, aiming at least one of the sending and receiving devices relative to each other, mutually timing activation of the sending and receiving devices, and motioning at least one of the sending and receiving devices relative to each other, and wherein at least one unique electronic identification is wirelessly sent between only the sending user and the receiving user in response to said mutually designating between the sending user and the receiving user;

(d) downloading the at least one wireless electronic identification locally to the receiving device; and (e) using said at least one identification downloaded locally to the receiving device to access data about at least one of the parties via the service provider.

31. A wireless one-to-one communication method, comprising the steps of:

providing a plurality of wireless electronic devices;

registering at least one user to a service provider so as to associate the at least one user to one of the plurality of wireless electronic devices;

associating a unique electronic identification to each of the plurality of wireless electronic devices;

storing the unique electronic identification assigned to each of the plurality of wireless electronic devices in a data server having a database, the database being configured to limit access of third parties to information associated with the unique electronic identification;

wirelessly transmitting a unique electronic device identification of a first one of the wireless electronic devices only to a second one of the wireless electronic devices in response to a sending party having one of the wireless electronic devices and a receiving party having the other of wireless electronics devices mutually selecting each other and designating each other so as to allow one-to-one communication therebetween, wherein said step of designating between the sending and the receiving party includes the sending party and the receiving party mutually targeting their respective wireless electronic devices by at least one of the parties performing at least one of the following steps: moving into proximity with the other party, aiming at least one of the wireless electronic devices relative to each other, mutually timing activation of the wireless electronic devices, and motioning at least one of the wireless electronic devices relative to each other;

receiving the unique electronic identification of said first one of the wireless electronic devices by said second one of the wireless electronic devices;

downloading the unique electronic identification locally to the wireless electronic device of the receiving party; and using the unique electronic identification downloaded to the wireless electronic device of the receiving party to access information about at least one of the parties from the data server.

32. The method of claim 31, further comprising the steps of:
   storing information corresponding to each user in the database.

33. The method of claim 31, further comprising the steps of:
   uploading the received unique electronic identification from the wireless electronic device of the receiving party to a computer system, the computer system connecting with the data server;
   matching the uploaded unique electronic identification with one of the unique electronic identifications stored in the data server;
   retrieving information associated with the determined unique wireless electronic identification by the database; and
   displaying the retrieved information.

* * * * *